United States Patent
Du et al.

(10) Patent No.: US 11,934,259 B2
(45) Date of Patent: Mar. 19, 2024

(54) FAILURE DIAGNOSIS DEVICE, FAILURE DIAGNOSIS SYSTEM, HOUSEHOLD ELECTRICAL APPLIANCE, SENSOR UNIT, AND FAILURE DIAGNOSIS METHOD

(71) Applicant: Panasonic Intellectual Property Management Co., Ltd., Osaka (JP)

(72) Inventors: Wanjing Du, Kyoto (JP); Yuji Osaki, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 22 days.

(21) Appl. No.: 17/802,070

(22) PCT Filed: Feb. 19, 2021

(86) PCT No.: PCT/JP2021/006304
§ 371 (c)(1),
(2) Date: Aug. 24, 2022

(87) PCT Pub. No.: WO2021/172187
PCT Pub. Date: Sep. 2, 2021

(65) Prior Publication Data
US 2023/0021535 A1 Jan. 26, 2023

(30) Foreign Application Priority Data
Feb. 27, 2020 (JP) ................................. 2020-032010

(51) Int. Cl.
*G06F 11/00* (2006.01)
*G06F 11/07* (2006.01)

(52) U.S. Cl.
CPC ........ *G06F 11/0793* (2013.01); *G06F 11/076* (2013.01); *G06F 11/079* (2013.01)

(58) Field of Classification Search
CPC ............................ G06F 11/079; G06F 11/076
(Continued)

(56) References Cited

U.S. PATENT DOCUMENTS 6,308,289 B1 * 10/2001 Ahrens ............... G06F 11/3058
714/48
10,217,068 B1 * 2/2019 Davis ...................... G07F 9/026
(Continued)

FOREIGN PATENT DOCUMENTS

| JP | H07-064595 A | 3/1995 |
| JP | 4028768 B2 | 12/2007 |
| JP | 2017-086897 A | 5/2017 |

OTHER PUBLICATIONS

International Search Report issued in International Patent Application No. PCT/JP2021/006304, dated May 18, 2021; with English translation.
(Continued)

*Primary Examiner* — Sarai E Butler
(74) *Attorney, Agent, or Firm* — Rimon P.C.

(57) ABSTRACT

A failure diagnosis device includes a communication unit, a data comparison unit, and an eligibility determination unit. The communication unit acquires first physical quantity data and second physical quantity data of a type different from that of the first physical quantity data that are used for performing failure diagnosis of a home appliance acquired by a sensor unit, and first control information related to the second physical quantity data acquired by the home appliance. The data comparison unit compares the second physical quantity data with the first control information. The eligibility determination unit determines whether or not the first physical quantity data is eligible as data used for the failure diagnosis based on a comparison result obtained by the data comparison unit.

7 Claims, 12 Drawing Sheets

(58) Field of Classification Search
USPC .......................................................... 714/1–57
See application file for complete search history.

(56) References Cited

U.S. PATENT DOCUMENTS

| | | | |
|---|---|---|---|
| 2003/0016124 A1 | 1/2003 | Schmidt et al. | |
| 2010/0259404 A1* | 10/2010 | Cho ..................... | H04L 12/2825 |
| | | | 340/679 |
| 2011/0054845 A1* | 3/2011 | Han ..................... | H04L 12/2825 |
| | | | 702/185 |
| 2016/0378605 A1* | 12/2016 | Teshome ............. | G06F 11/1417 |
| | | | 714/36 |
| 2016/0381201 A1* | 12/2016 | Park .................. | H04M 1/72415 |
| | | | 455/557 |
| 2017/0122794 A1 | 5/2017 | Schmidt | |
| 2017/0257497 A1* | 9/2017 | Ono .................... | H04N 1/00506 |
| 2018/0150344 A1* | 5/2018 | Kim ....................... | G06F 11/079 |
| 2019/0138423 A1* | 5/2019 | Agerstam ............ | G06F 11/3466 |

OTHER PUBLICATIONS

International Preliminary Report on Patentability dated Sep. 9, 2022 issued in International Patent Application No. PCT/JP2021/006304, with English translation.

* cited by examiner

Fig.7

| TIME | A1<br>FIRST<br>PHYSICAL<br>QUANTITY<br>DATA | B1<br>SECOND<br>PHYSICAL<br>QUANTITY<br>DATA | B2<br>FIRST<br>CONTROL<br>INFORMATION | C2<br>SECOND<br>CONTROL<br>INFORMATION |
|---|---|---|---|---|
| ... | ... | ... | ... | ... |
| 2017/1/20 13:56:00 | A11 | B11 | B21 | C21 |
| 2017/1/20 13:56:05 | – | – | B22 | – |
| 2017/1/20 13:56:10 | A12 | B12 | B23 | – |
| 2017/1/20 13:56:15 | – | – | B24 | – |
| 2017/1/20 13:56:20 | A13 | B13 | B25 | C22 |
| 2017/1/20 13:56:25 | – | – | B26 | – |
| ... | ... | ... | ... | ... |

FAILURE DIAGNOSIS DEVICE, FAILURE DIAGNOSIS SYSTEM, HOUSEHOLD ELECTRICAL APPLIANCE, SENSOR UNIT, AND FAILURE DIAGNOSIS METHOD

CROSS-REFERENCE OF RELATED APPLICATIONS

This application is the U.S. National Phase under 35 U.S.C. § 371 of International Patent Application No. PCT/JP2021/006304, filed on Feb. 19, 2021, which in turn claims the benefit of Japanese Patent Application No. 2020-032010, filed on Feb. 27, 2020, the entire disclosures of which Applications are incorporated by reference herein.

TECHNICAL FIELD

The present disclosure relates to a failure diagnosis device, a failure diagnosis system, a home appliance, a sensor unit, and a failure diagnosis method.

BACKGROUND ART

Conventionally, for example, a user such as a repairer attaches a sensor unit to a home appliance to perform failure diagnosis of the home appliance based on information of the sensor unit.

SUMMARY OF THE INVENTION

However, whether or not the sensor unit is appropriately attached to a home appliance for which to perform failure diagnosis largely depends on a method of attaching the sensor unit by the user. In a case where the sensor unit is not appropriately attached to the home appliance, measurement data for performing the failure diagnosis cannot be accurately obtained, so that an erroneous result may be obtained in the failure diagnosis.

Therefore, an object of the present disclosure is to provide a failure diagnosis device, a failure diagnosis system, a home appliance, a sensor unit, and a failure diagnosis method in which accuracy of failure diagnosis is improved by determination of whether or not the sensor unit is appropriately attached to the home appliance. Note that, as described above, since determination as to whether or not the sensor unit is appropriately attached has been conventionally made by the user, there is no prior art document information to be described.

A failure diagnosis device according to one aspect of the present disclosure includes a communication unit, a data comparison unit, and an eligibility determination unit. The communication unit acquires first physical quantity data and second physical quantity data of a type different from that of the first physical quantity data that are used for performing failure diagnosis of a home appliance acquired by a sensor unit, and first control information related to the second physical quantity data acquired by the home appliance. The data comparison unit compares the second physical quantity data with the first control information. The eligibility determination unit determines whether or not the first physical quantity data is eligible as data used for the failure diagnosis based on a comparison result obtained by the data comparison unit.

A failure diagnosis system according to one aspect of the present disclosure includes a home appliance, a sensor unit that measures a plurality of types of data related to the home appliance, and a failure diagnosis device that performs failure diagnosis of the home appliance. The failure diagnosis device includes a communication unit, a data comparison unit, and an eligibility determination unit. The communication unit acquires first physical quantity data and second physical quantity data of a type different from that of the first physical quantity data that are used for performing failure diagnosis of the home appliance acquired by the sensor unit, and first control information related to the second physical quantity data acquired by the home appliance. The data comparison unit compares the second physical quantity data with the first control information. The eligibility determination unit determines whether or not the first physical quantity data is eligible as data used for the failure diagnosis based on a comparison result obtained by the data comparison unit.

A home appliance according to one aspect of the present disclosure, for which to perform failure diagnosis using a plurality of types of measurement data measured by a sensor unit, the home appliance includes a communication unit, a data comparison unit, and an eligibility determination unit. The communication unit acquires first physical quantity data and second physical quantity data of a type different from that of the first physical quantity data that are used for performing failure diagnosis of the home appliance acquired by the sensor unit, and first control information related to the second physical quantity data acquired by the home appliance. The data comparison unit compares the second physical quantity data with the first control information. The eligibility determination unit determines whether or not the first physical quantity data is eligible as data used for the failure diagnosis based on a comparison result obtained by the data comparison unit.

A sensor unit according to one aspect of the present disclosure that measures a plurality of types of data related to a home appliance and performs failure diagnosis of the home appliance, the sensor unit includes a communication unit, a data comparison unit, and an eligibility determination unit. The communication unit acquires first physical quantity data and second physical quantity data of a type different from that of the first physical quantity data that are used for performing failure diagnosis of the home appliance acquired by the sensor unit, and first control information related to the second physical quantity data acquired by the home appliance. The data comparison unit compares the second physical quantity data with the first control information. The eligibility determination unit determines whether or not the first physical quantity data is eligible as data used for the failure diagnosis based on a comparison result obtained by the data comparison unit.

A failure diagnosis method according to one aspect of the present disclosure includes the steps of: acquiring first physical quantity data and second physical quantity data of a type different from that of the first physical quantity data that are used for performing failure diagnosis of a home appliance acquired by a sensor unit, and first control information related to the second physical quantity data acquired by the home appliance; comparing the second physical quantity data with the first control information; and determining whether or not the first physical quantity data is eligible as data used for the failure diagnosis based on a comparison result obtained in the data comparing step.

According to a failure diagnosis device, a failure diagnosis system, a home appliance, a sensor unit, and a failure diagnosis method according to the present disclosure, accuracy of failure diagnosis of the home appliance can be improved.

BRIEF DESCRIPTION OF THE DRAWINGS

FIG. 7 is a diagram illustrating an example of first physical quantity data, second physical quantity data, and first control information in a certain period of time according to the present disclosure.

EMBODIMENT(S) FOR CARRYING OUT THE INVENTION

Figure 1:
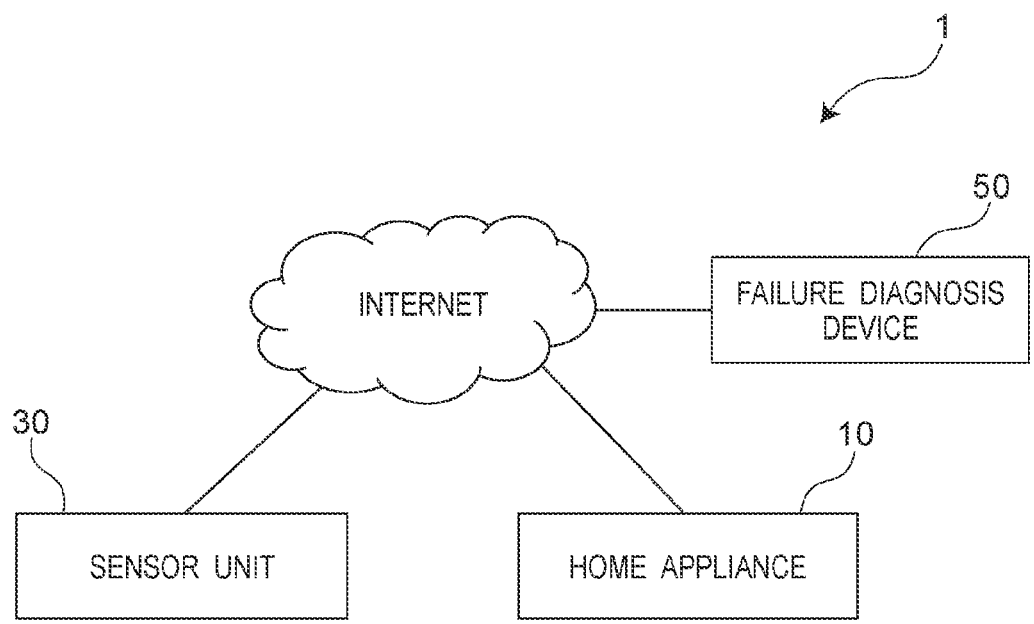
FIG. 1 is a block diagram illustrating a schematic configuration of a failure diagnosis system according to the present disclosure.

A failure diagnosis device according to the first aspect of the present disclosure includes a communication unit, a data comparison unit, and an eligibility determination unit. The communication unit acquires first physical quantity data and second physical quantity data of a type different from that of the first physical quantity data that are used for performing failure diagnosis of a home appliance acquired by a sensor unit, and first control information related to the second physical quantity data acquired by the home appliance. The data comparison unit compares the second physical quantity data with the first control information. The eligibility determination unit determines whether or not the first physical quantity data is eligible as data used for the failure diagnosis based on a comparison result obtained by the data comparison unit.

The failure diagnosis device according to the second aspect of the present disclosure, in the first aspect, wherein the data comparison unit converts the first control information into a physical quantity which is same as the second physical quantity data and compares the second physical quantity data with the first control information.

The failure diagnosis device according to the third aspect of the present disclosure, in the first or second aspect, wherein the communication unit further acquires third physical quantity data of a type different from that of the first physical quantity data and the second physical quantity data acquired by the sensor unit, and second control information related to the third physical quantity data acquired by the home appliance, and the data comparison unit further compares the third physical quantity data with the second control information.

A failure diagnosis system according to the fourth aspect of the present disclosure includes a home appliance, a sensor unit that measures a plurality of types of data related to the home appliance, and a failure diagnosis device that performs failure diagnosis of the home appliance. The failure diagnosis device includes a communication unit, a data comparison unit, and an eligibility determination unit. The communication unit acquires first physical quantity data and second physical quantity data of a type different from that of the first physical quantity data that are used for performing failure diagnosis of the home appliance acquired by the sensor unit, and first control information related to the second physical quantity data acquired by the home appliance. The data comparison unit compares the second physical quantity data with the first control information. The eligibility determination unit determines whether or not the first physical quantity data is eligible as data used for the failure diagnosis based on a comparison result obtained by the data comparison unit.

A home appliance according to the fifth aspect of the present disclosure, for which to perform failure diagnosis using a plurality of types of measurement data measured by a sensor unit, the home appliance includes a communication unit, a data comparison unit, and an eligibility determination unit. The communication unit acquires first physical quantity data and second physical quantity data of a type different from that of the first physical quantity data that are used for performing failure diagnosis of the home appliance acquired by the sensor unit, and first control information related to the second physical quantity data acquired by the home appliance. The data comparison unit compares the second physical quantity data with the first control information. The eligibility determination unit determines whether or not the first physical quantity data is eligible as data used for the failure diagnosis based on a comparison result obtained by the data comparison unit.

A sensor unit according to the sixth aspect of the present disclosure that measures a plurality of types of data related to a home appliance and performs failure diagnosis of the home appliance, the sensor unit includes a communication unit, a data comparison unit, and an eligibility determination unit. The communication unit acquires first physical quantity data and second physical quantity data of a type different from that of the first physical quantity data that are used for performing failure diagnosis of the home appliance acquired by the sensor unit, and first control information related to the second physical quantity data acquired by the home appliance. The data comparison unit compares the second physical quantity data with the first control information. The eligibility determination unit determines whether or not the first physical quantity data is eligible as data used for the failure diagnosis based on a comparison result obtained by the data comparison unit.

A failure diagnosis method according to the seventh aspect of the present disclosure includes the steps of: acquiring first physical quantity data and second physical quantity data of a type different from that of the first physical quantity data that are used for performing failure diagnosis of a home appliance acquired by a sensor unit, and first control information related to the second physical quantity data acquired by the home appliance; comparing the second physical quantity data with the first control information; and determining whether or not the first physical quantity data is eligible as data used for the failure diagnosis based on a comparison result obtained in the data comparing step.

Hereinafter, an embodiment of a failure diagnosis system according to the present disclosure will be described with reference to the accompanying drawings. The present disclosure is not limited to a specific configuration of an embodiment described below, and a configuration based on a similar technical idea is included in the present disclosure.

EMBODIMENT

A schematic configuration of a failure diagnosis system 1 according to the present embodiment will be described with reference to FIG. 1. FIG. 1 is a block diagram illustrating a schematic configuration of the failure diagnosis system 1.

As shown in FIG. 1, the failure diagnosis system 1 includes a home appliance 10, a sensor unit 30 attached to the home appliance 10, and a failure diagnosis device 50. The failure diagnosis system 1 is a system that performs failure diagnosis of the home appliance 10 using the failure diagnosis device 50. In the failure diagnosis system 1 of the present embodiment, the failure diagnosis device 50 performs failure diagnosis of the home appliance 10 using control information of the home appliance 10 and measurement data of the sensor unit 30. Details of the failure diagnosis will be described later.

Figure 2:
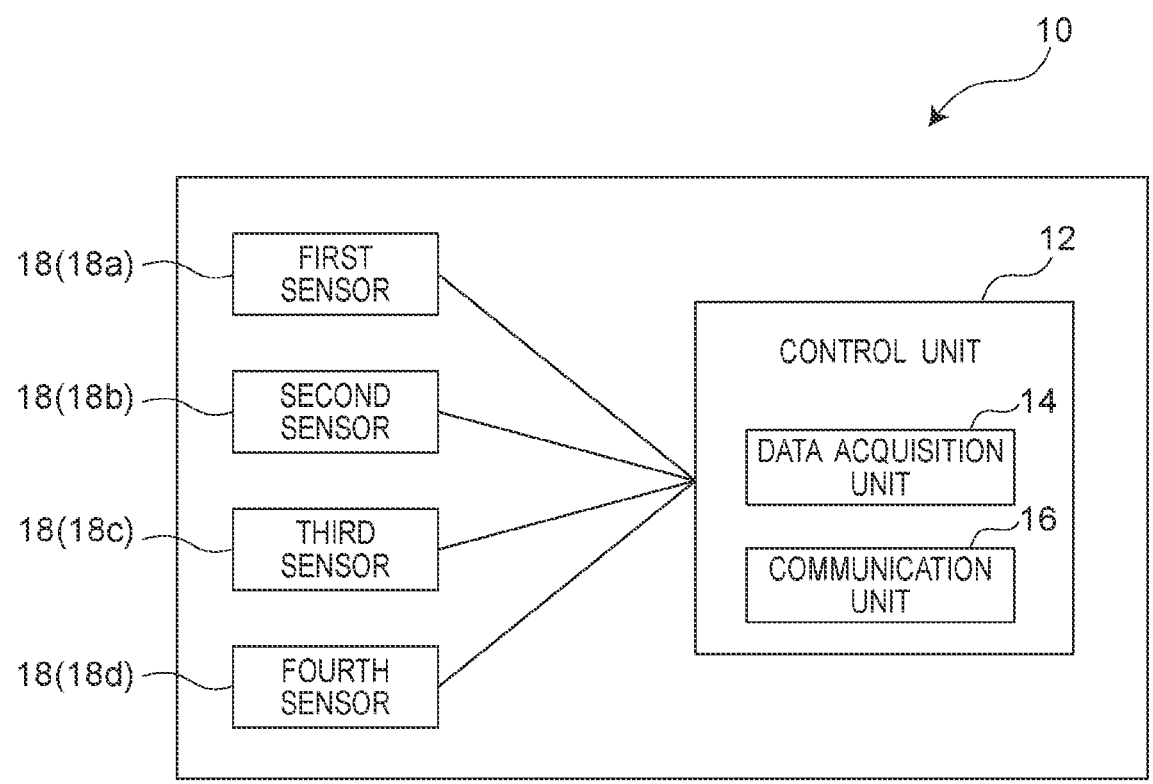
FIG. 2 is a block diagram illustrating a schematic configuration of a home appliance according to the present disclosure.

Next, a schematic configuration of the home appliance 10 will be described with reference to FIG. 2. FIG. 2 is a block diagram illustrating a schematic configuration of the home appliance 10.

As shown in FIG. 2, the home appliance 10 includes a control unit 12 and sensors 18. For example, the home appliance 10 is an air conditioner, a washing machine, a refrigerator, an IH cooking heater, a water heater, or the like. In description below, a case where the home appliance 10 is an air conditioner will be described as an example.

The control unit 12 controls components (for example, a louver, a heat exchanger, a blowing fan, and the like) constituting the home appliance 10. For example, the control unit 12 may be realized by a processing circuit including a general-purpose processor such as a CPU or an MPU that realizes a predetermined function by executing a program stored in a storage such as a memory. For example, the control unit 12 includes a microcomputer.

For example, the control unit 12 drives and controls a louver to adjust an angle of the louver. In this manner, the louver is controlled to be at angles of, for example, a plurality of stages (high, medium, low, and the like). At this time, the control unit 12 adjusts the angle of the louver, for example, by controlling an amount of current applied to a motor.

The control unit 12 includes a data acquisition unit 14 and a communication unit 16. Data of each component controlled by the control unit 12 is acquired by a data acquisition unit 14 via a plurality of sensors 18, for example. The communication unit 16 receives control information of the control unit 12 and information of the data acquisition unit 14, and transmits data used for failure diagnosis to the failure diagnosis device 50. At this time, the communication unit 16 of the present embodiment transmits time information of data to be transmitted to the failure diagnosis device 50 to the failure diagnosis device 50. The communication unit 16 may also transmit only control information of the control unit 12 to the failure diagnosis device 50.

Figure 3:
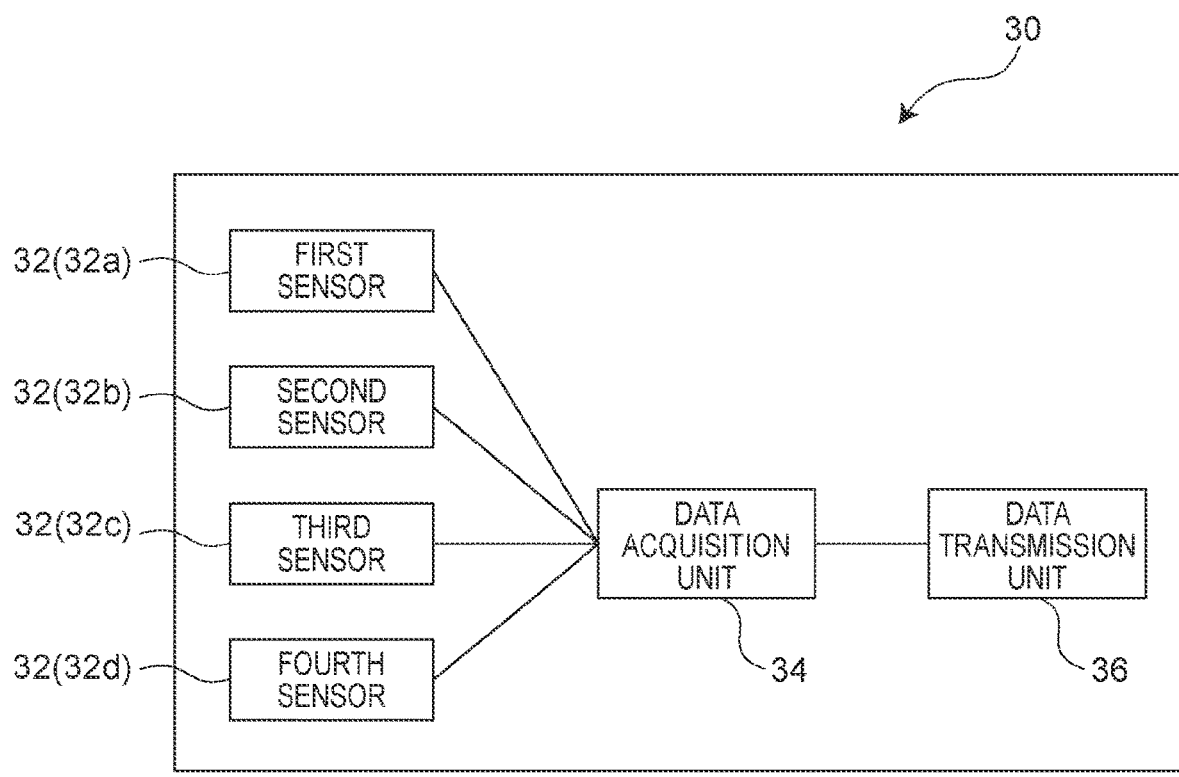
FIG. 3 is a block diagram illustrating a schematic configuration of a sensor unit according to the present disclosure.

Next, a schematic configuration of the sensor unit 30 will be described with reference to FIG. 3. FIG. 3 is a block diagram illustrating a schematic configuration of the sensor unit 30.

As shown in FIG. 3, the sensor unit 30 includes sensors 32, a data acquisition unit 34, and a data transmission unit 36. The sensor unit 30 is a multi-sensor that is provided in the home appliance 10 and measures a plurality of types of data related to the home appliance 10. For example, the sensor unit 30 is a unit capable of measuring a plurality of types of data and capable of transmitting each piece of measured data through a common data transmission unit 36.

The sensor unit 30 is detachably attached to the home appliance 10, for example, when failure diagnosis of the home appliance 10 is performed. The sensor unit 30 is attached to, for example, a louver of an air conditioner.

The sensors 32 of the present embodiment includes a first sensor 32a that measures first physical quantity data, a second sensor 32b that measures second physical quantity data, and a third sensor 32c and a fourth sensor 32d that measure other data. The third sensor 32c and the fourth sensor 32d may not be provided in the sensor unit 30.

The first physical quantity data is data used to perform failure diagnosis. Specifically, the first physical quantity data is data used to diagnose whether or not operation control (for example, temperature control, humidity control, wind speed control, light amount control, and the like) of the home appliance 10 is normal. For example, the first sensor 32a is a temperature sensor that measures blowing temperature of an air conditioner, and the first physical quantity data is data of blowing temperature of an air conditioner.

The second physical quantity data is data of a type different from that of the first physical quantity data. Here, different types of data are, for example, physical quantities independent from each other. The second physical quantity data is data for determining whether or not the first physical quantity data is eligible as data used for failure diagnosis. For example, the second sensor 32b is a gyro sensor that measures an inclination angle of a louver (a blowing angle of an air conditioner), and the second physical quantity data is data of an inclination angle of the louver. Whether or not the first physical quantity data is eligible is determined by comparing the second physical quantity data with first control information of the home appliance 10 related to the second physical quantity data. Details of eligibility determination of the first physical quantity data will be described later. Here, the first control information related to the second physical quantity data is, for example, control information of the same physical quantity as the second physical quantity data in control information of the home appliance 10, control information that can be converted into a physical quantity of the second physical quantity data, or the like. The first control information may include a plurality of pieces of control information of the home appliance 10, and a plurality of pieces of the control information may be converted into a physical quantity of the second physical quantity data.

The data acquisition unit 34 acquires measurement data of the sensors 32. The data transmission unit 36 receives measurement data acquired by the data acquisition unit 34 and transmits the data to the failure diagnosis device 50. The data transmission unit 36 of the present embodiment transmits time information of data to be transmitted to the failure diagnosis device 50 to the failure diagnosis device 50.

Figure 4:
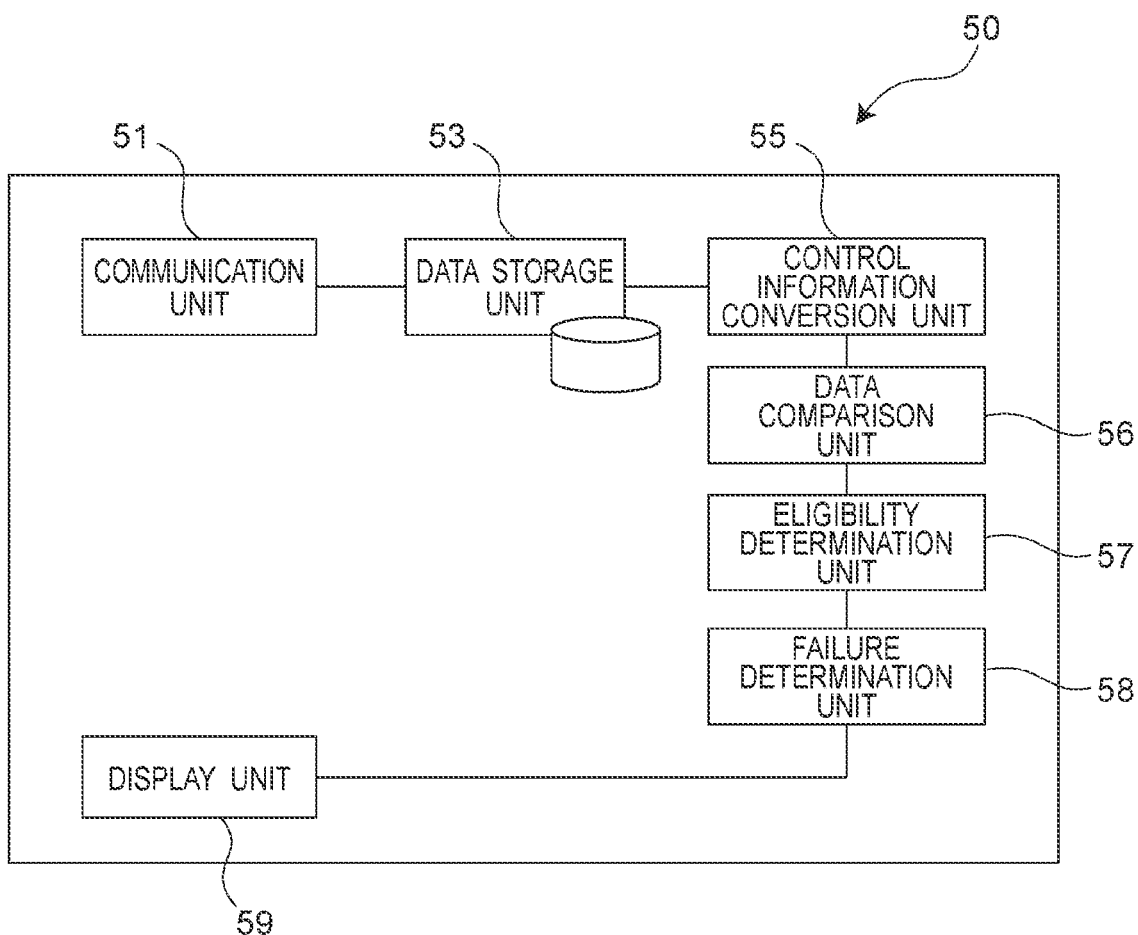
FIG. 4 is a block diagram illustrating a schematic configuration of a failure diagnosis device according to the present disclosure.

Next, a schematic configuration of the failure diagnosis device 50 will be described with reference to FIG. 4. FIG. 4 is a block diagram illustrating a schematic configuration of the failure diagnosis device 50.

As shown in FIG. 4, the failure diagnosis device 50 according to the present embodiment includes a communication unit 51, a data storage unit 53, a control information conversion unit 55, a data comparison unit 56, an eligibility determination unit 57, a failure determination unit 58, and a display unit 59. The failure diagnosis device 50 is, for example, a smartphone or a tablet terminal. The failure diagnosis device 50 may be, for example, a server. The failure diagnosis device 50 is communicably connected to the home appliance 10 and the sensor unit 30 by the communication unit 51. Connection between the home appliance 10 and the sensor unit 30, and the failure diagnosis device 50 may be wireless connection or wired connection. The failure diagnosis device 50 according to the present embodiment includes a memory and a processing circuit corresponding to a processor such as a CPU, and the control information conversion unit 55, the data comparison unit 56, the eligibility determination unit 57, and the failure determination unit 58 may cause these elements to function by causing the processor to execute a program that causes these elements stored in the memory to function, for example. Alternatively, the control information conversion unit 55, the data comparison unit 56, the eligibility determination unit 57, and the failure determination unit 58 may be configured using an integrated circuit that causes these elements to function.

The communication unit 51 receives control information and information of the data acquisition unit 14 from the home appliance 10 (communication unit 16), receives measurement data from the sensor unit 30 (data transmission unit 36), and transmits the received data to the data storage unit 53. The data storage unit 53 stores the data transmitted by the communication unit 51. The data storage unit 53 of the present embodiment stores the data transmitted by the communication unit 51 in association with time information.

In a case where a physical quantity of the first control information of the home appliance 10 is different from the second physical quantity data of the sensor unit 30, the control information conversion unit 55 converts the physical quantity of the first control information into converted data of the same physical quantity as the second physical quantity data. The data comparison unit 56 compares the second physical quantity data with the first control information related to the second physical quantity data.

For example, in a case where a physical quantity of the first control information of a louver of an air conditioner is a current amount and a physical quantity of the second physical quantity data is an inclination angle, since the physical quantities are different, the physical quantity of the first control information is converted such that the physical quantity of the first control information becomes an inclination angle. For example, the first control information is converted by a program based on a table in which a physical quantity of the first control information and a physical quantity of converted data are associated with each other.

Based on the second physical quantity data and the first control information, the eligibility determination unit 57 determines whether or not the first physical quantity data of the sensor unit 30 is eligible as data used for failure diagnosis. The eligibility determination unit 57 determines eligibility of the first physical quantity data by checking whether or not the second physical quantity data satisfies a predetermined criterion regarding the first control information. Specifically, in a case where the second physical quantity data compared by the data comparison unit 56 is within a predetermined numerical range including the first control information, the eligibility determination unit 57 determines that the first physical quantity data is eligible. On the other hand, in a case where the second physical quantity data does not fall within the predetermined numerical range, the eligibility determination unit 57 determines that the first physical quantity data is ineligible. In this manner, for example, whether or not the sensor unit 30 is properly installed in a louver can be determined.

When the eligibility determination unit 57 determines that the first physical quantity data is eligible, the failure determination unit 58 performs failure determination of the home appliance 10 based on the first physical quantity data. For example, when the first physical quantity data is within a predetermined numerical range, the failure determination unit 58 determines that the home appliance 10 does not fail and is normal. On the other hand, when the first physical quantity data is out of the predetermined numerical range, the failure determination unit 58 determines that the home appliance 10 has failed.

The display unit 59 displays a determination result of the eligibility determination and the failure determination. For example, the display unit 59 is a display. The display unit 59 may be configured to display only one of a determination result of the eligibility determination and the failure determination.

Figure 5:
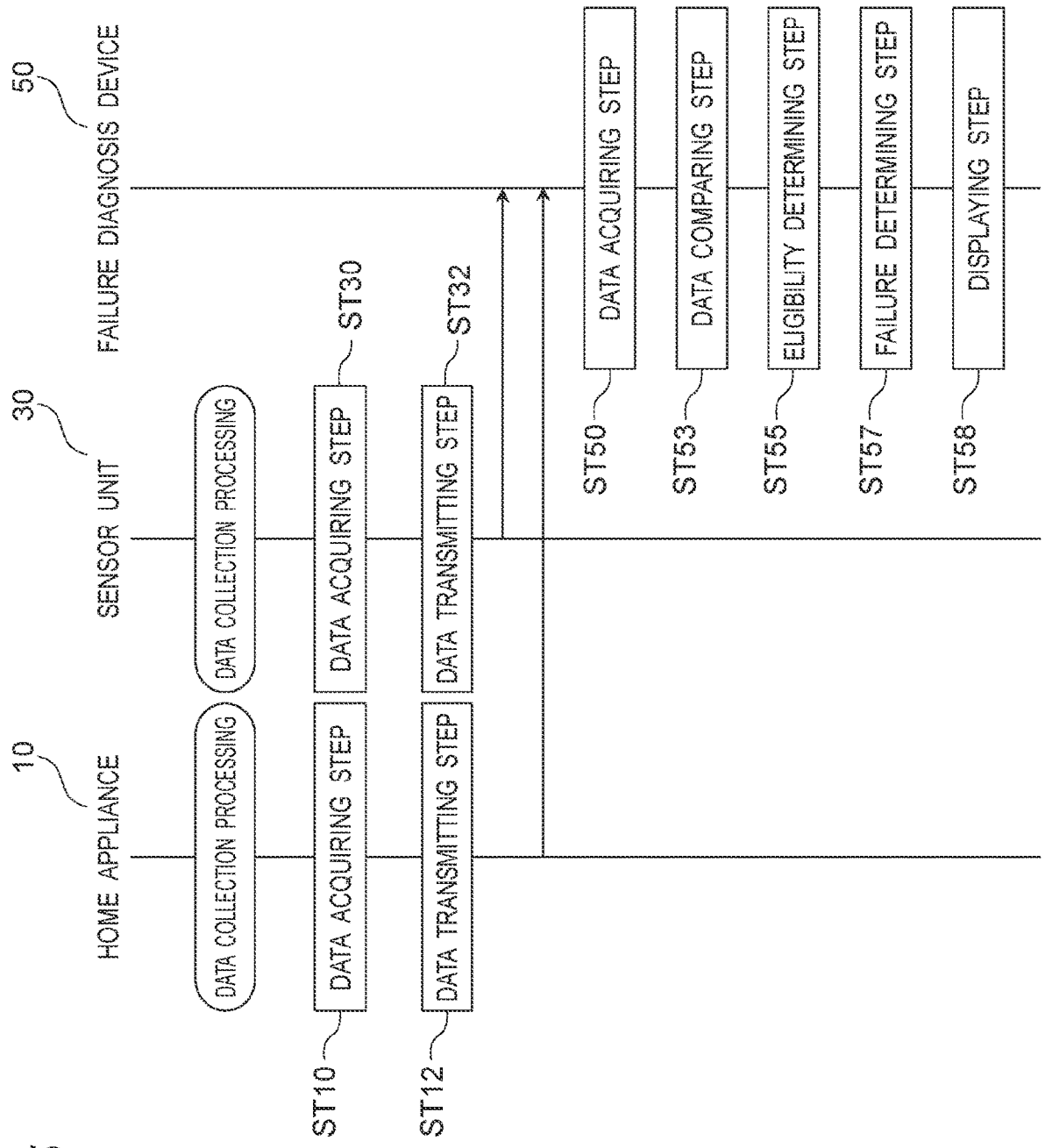
FIG. 5 is a schematic diagram illustrating a process of failure diagnosis of the failure diagnosis system according to the present disclosure.

Next, an example of a process of failure diagnosis in the failure diagnosis system 1 will be described with reference to FIG. 5. FIG. 5 is a schematic diagram illustrating a process of failure diagnosis of the failure diagnosis system 1.

As shown in FIG. 5, data collection processing is performed by the home appliance 10 and the sensor unit 30. Specifically, the home appliance 10 performs a data acquiring step ST10 and a data transmitting step ST12, and the sensor unit 30 performs a data acquiring step ST30 and a data transmitting step ST32.

In the data acquiring step ST10, control information of the control unit 12 and information of the data acquisition unit 14 are acquired. In the data transmitting step ST12, the data acquired in the data acquiring step ST10 is transmitted to the failure diagnosis device 50 by the communication unit 16.

In the data acquiring step ST30, the data acquisition unit 34 acquires measurement data of the sensor unit 30. Specifically, the first physical quantity data measured by the first sensor 32a and the second physical quantity data measured by the second sensor 32b are acquired by the data acquisition unit 34. In the data transmitting step ST32, data (the first physical quantity data and the second physical quantity data) acquired by the data acquisition unit 34 is transmitted to the failure diagnosis device 50 by the data transmission unit 36.

Failure diagnosis is performed by the failure diagnosis device 50 based on the data transmitted in the data transmitting steps ST12 and ST32. In the failure diagnosis device 50, a data acquiring step ST50, a data comparing step ST53, an eligibility determining step ST55, a failure determining step ST57, and a displaying step ST58 are performed.

In the data acquiring step ST50, the communication unit 51 acquires data transmitted in the data transmitting steps ST12 and ST32. In the data comparing step ST53, the second physical quantity data acquired from the sensor unit 30 is compared with the first control information of the home appliance 10. In the eligibility determining step ST55, whether or not the first physical quantity data is eligible is determined on the basis of a comparison result obtained by the data comparison unit 56. Specifically, in the eligibility determining step ST55, in a case where the second physical quantity data compared by the data comparison unit 56 is within a predetermined numerical range including the first control information, the first physical quantity data is determined to be eligible. On the other hand, in a case where the second physical quantity data does not fall within the predetermined numerical range including the first control information, the first physical quantity data is determined to be ineligible.

In the failure determining step ST57, failure determination of the home appliance 10 is performed on the basis of the first physical quantity data determined to be eligible in the eligibility determining step ST55. In the displaying step ST58, a determination result of eligibility obtained in the eligibility determining step ST55 and a determination result of failure obtained in the failure determining step ST57 are displayed. In the displaying step ST58, the determination result is displayed on the display unit 59 of the failure diagnosis device 50.

Figure 6:
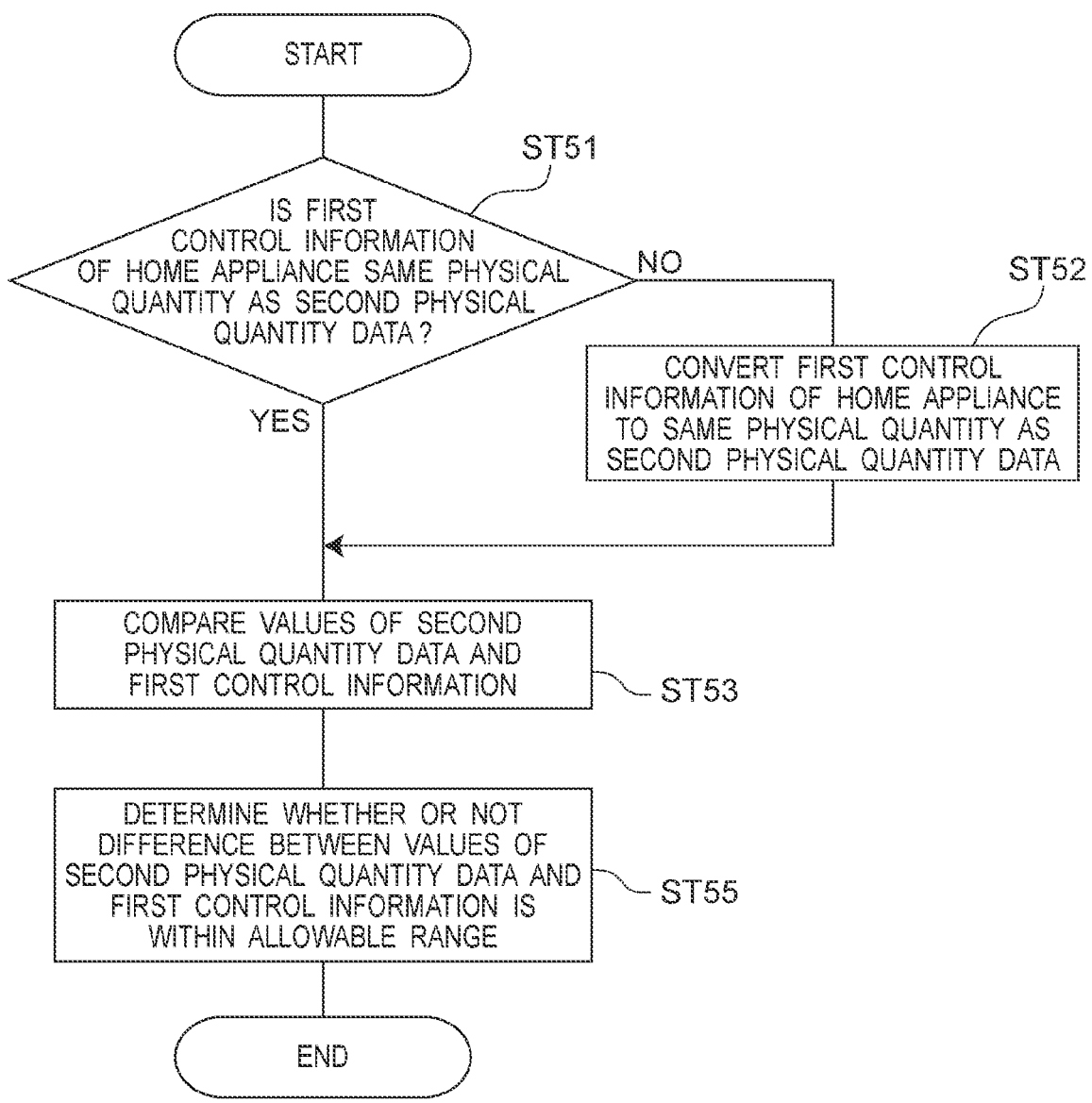
FIG. 6 is a schematic diagram illustrating a process of a data comparing step and an eligibility determining step according to the present disclosure.

Next, details of the data comparing step ST53 and the eligibility determining step ST55 will be described with reference to FIG. 6. FIG. 6 is a schematic diagram illustrating a process of the data comparing step ST53 and the eligibility determining step ST55.

As shown in FIG. 6, in the present embodiment, a physical quantity comparing step ST51 is performed before the data comparing step ST53 and the eligibility determining step ST55. In the physical quantity comparing step ST51, whether or not the second physical quantity data acquired from the sensor unit 30 and the first control information of the home appliance 10 are the same physical quantity is determined by comparison.

In the physical quantity comparing step ST51, in a case where the second physical quantity data of the sensor unit 30 and the first control information of the home appliance 10 are the same physical quantity, the data comparing step ST53 is performed after the physical quantity comparing step ST51. On the other hand, in the physical quantity comparing step ST51, in a case where the second physical quantity data and the first control information are different physical quantities, a converting step ST52 is performed after the physical quantity comparing step ST51. In the converting step ST52, the first control information is converted so as to have the same physical quantity as the second physical quantity data.

When the second physical quantity data and the first control information are the same physical quantity, comparison of numerical values is performed between the second physical quantity data and the first control information in the data comparing step ST53. When the second physical quantity data and the first control information are different physical quantities, numerical values are compared between the second physical quantity data and the converted first control information in the data comparing step ST53.

In the present embodiment, in the data comparing step ST53, data of a certain period of time accumulated in the data storage unit 53 is compared. In the data comparing step ST53, for example, data of a certain period of time of the home appliance 10 and the sensor unit 30 illustrated in FIG. 7 is compared. FIG. 7 is a diagram illustrating an example of the first physical quantity data, the second physical quantity data, and the first control information of a certain period of time.

As shown in FIG. 7, the first physical quantity data, the second physical quantity data, and the first control information are measured at predetermined time intervals, for example. For example, the first physical quantity data, the second physical quantity data, and the first control information are stored in the data storage unit 53 at different time intervals. In the comparison between the second physical quantity data and the first control information, for example, data such as an average value (moving average value, weighted average value, or the like) or a median value in a predetermined period of time is used.

Next, a process of an example of failure diagnosis using the failure diagnosis device 50 will be described with reference to FIGS. 8 to 12. FIGS. 8 to 12 are schematic diagrams illustrating display content of the display unit 59 of the failure diagnosis device 50 in the failure diagnosis. In the examples illustrated in FIGS. 8 to 12, the failure diagnosis is performed to determine whether there is abnormality in blowing temperature of the air conditioner.

Figure 8:
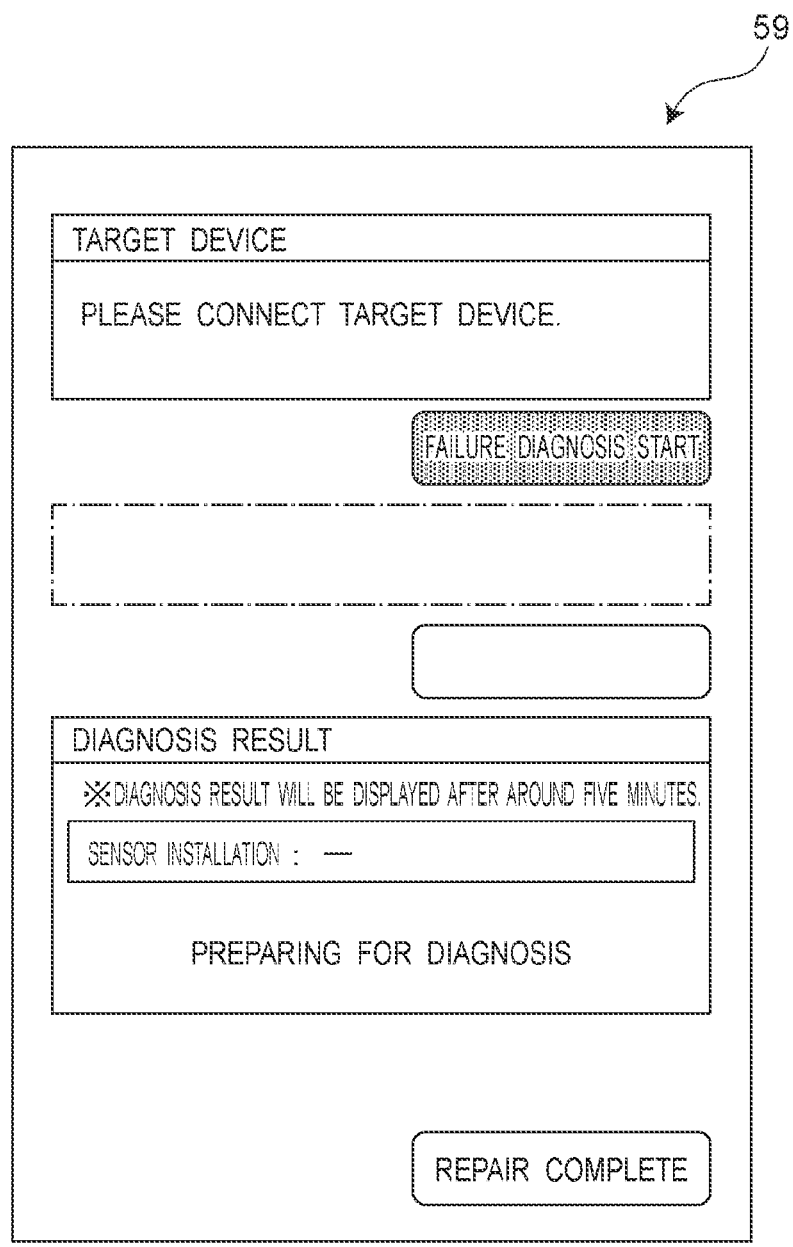
FIG. 8 is a schematic diagram illustrating display content of a display unit of the failure diagnosis device in the failure diagnosis according to the present disclosure.

First, the home appliance 10 and the failure diagnosis device 50 are connected. As shown in FIG. 8, the display unit 59 of the failure diagnosis device 50 displays to prompt connection to a target device (home appliance 10) for which to perform failure diagnosis. The failure diagnosis device 50 is linked to the home appliance 10 by wireless communication such as Bluetooth (registered trademark) or Wi-Fi (registered trademark), for example. Note that the connection between the home appliance 10 and the failure diagnosis device 50 may be performed by other communication means, and, for example, may be performed by wire.

Figure 9:
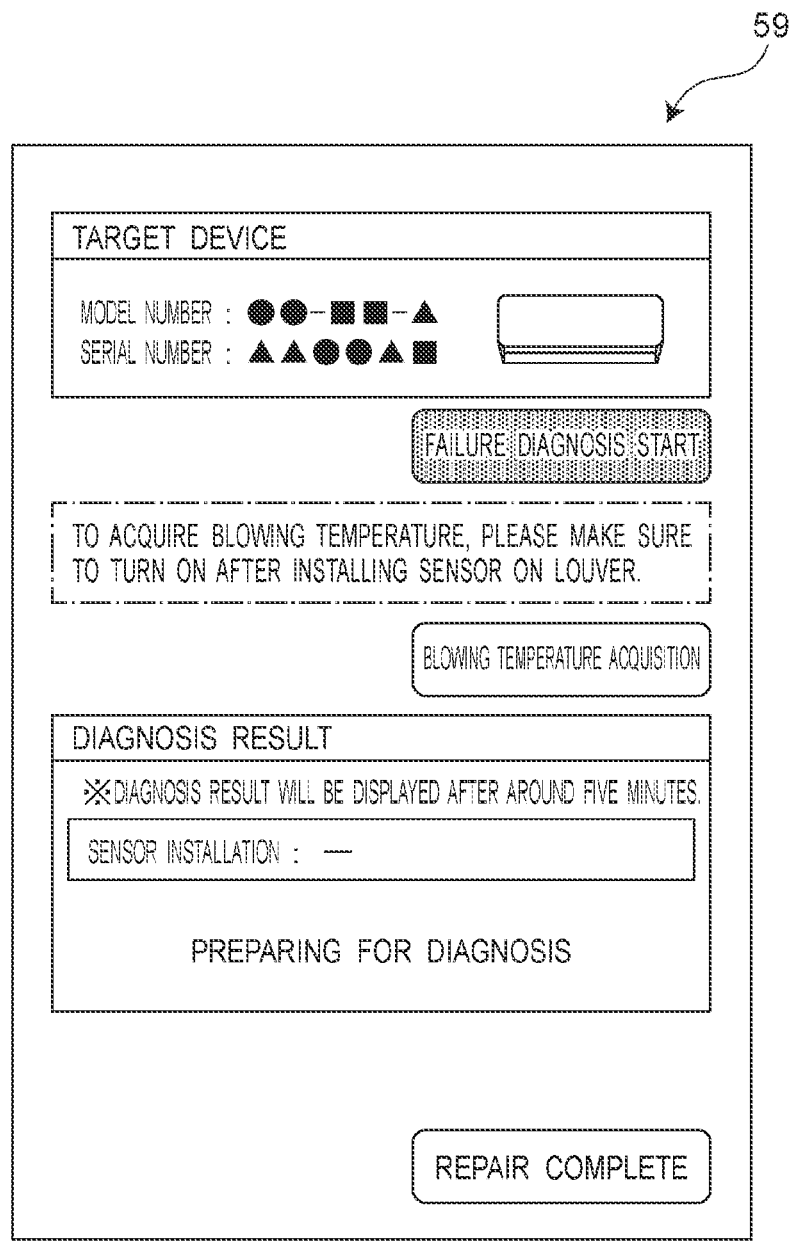
FIG. 9 is a schematic diagram illustrating display content of the display unit of the failure diagnosis device in the failure diagnosis according to the present disclosure.

When the connection between the home appliance 10 and the failure diagnosis device 50 is completed, for example, a model number, a serial number, an illustration, and the like of the home appliance 10 are displayed in a field of a target device on the display unit 59 as shown in FIG. 9. Furthermore, a "failure diagnosis start" button is displayed in a selectable state. For example, the user such as a repairer checks the field of a target device to confirm whether or not a linked target device is the home appliance 10 for which to perform the failure diagnosis, and then selects the "failure diagnosis start" button to start the failure diagnosis.

By the connection between the home appliance 10 and the failure diagnosis device 50, information of the home appliance 10 is transmitted to the failure diagnosis device 50. For example, control information (current amount data) and the like of a louver of an air conditioner are stored in the data storage unit 53 of the failure diagnosis device 50. The current amount data is converted into inclination angle data of the louver by the failure diagnosis device 50 (control information conversion unit) and stored in the data storage unit 53 as the first control information (converted data).

Figure 10:
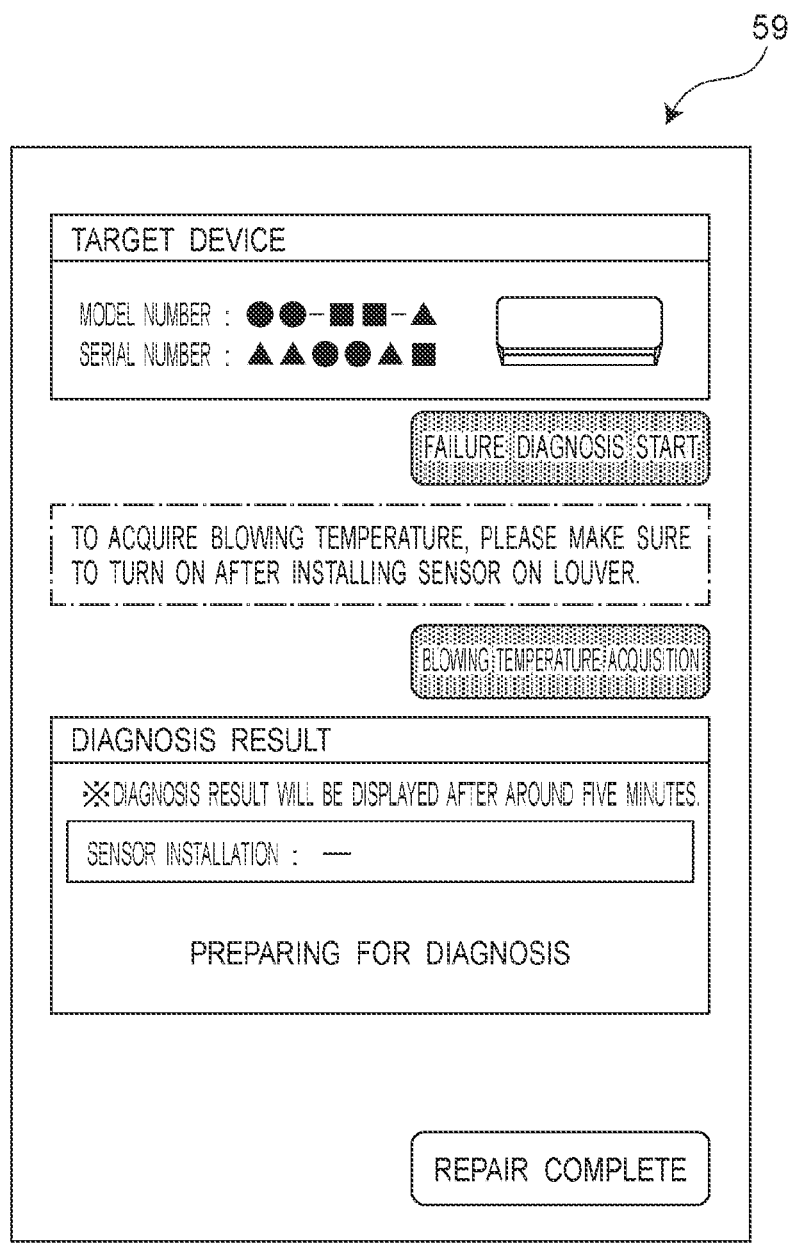
FIG. 10 is a schematic diagram illustrating display content of the display unit of the failure diagnosis device in the failure diagnosis according to the present disclosure.

After the "failure diagnosis start" button is selected, the "blowing temperature acquisition" button is displayed in a selectable state on the display unit 59 as shown in FIG. 10. Further, for example, display prompting appropriate attachment of the sensor unit 30 is performed on the display unit 59.

Before the "blowing temperature acquisition" button is selected, the sensor unit 30 is attached to the home appliance 10, and the sensor unit 30 and the failure diagnosis device 50 are connected. Similarly to the connection between the home appliance 10 and the failure diagnosis device 50, the sensor unit 30 and the failure diagnosis device 50 are wirelessly connected. Note that the sensor unit 30 and the failure diagnosis device 50 may be connected by wire, for example.

After the sensor unit 30 is attached to the home appliance 10, the "blowing temperature acquisition" button is selected to perform failure diagnosis of the home appliance 10. When the "blowing temperature acquisition" button is selected, measurement data of the sensor unit 30 is transmitted to the failure diagnosis device 50 connected to the sensor unit 30. For example, the data storage unit 53 of the failure diagnosis device 50 stores measurement data (first physical quantity data) of blowing temperature of an air conditioner and measurement data (second physical quantity data) of an inclination angle of a louver.

Figure 11:
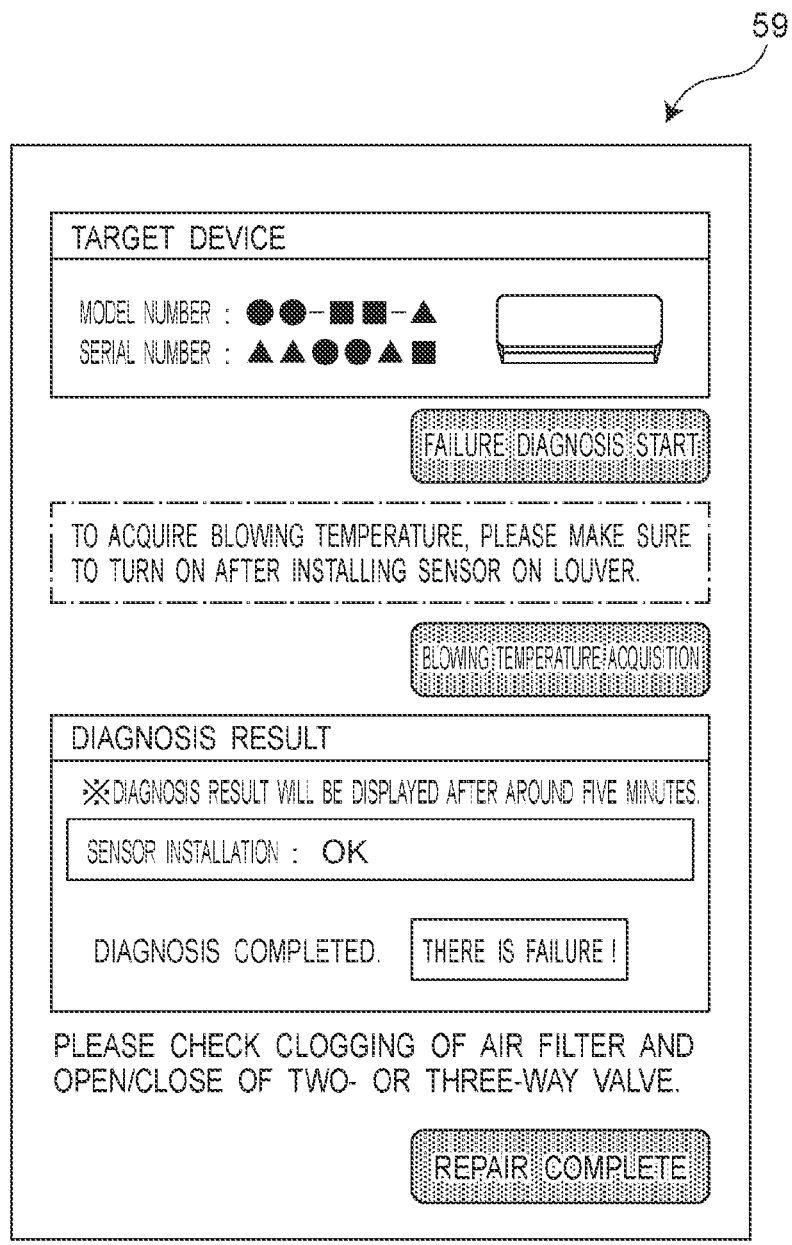
FIG. 11 is a schematic diagram illustrating display content of the display unit of the failure diagnosis device in the failure diagnosis according to the present disclosure.

Based on the second physical quantity data and the first control information stored in the data storage unit 53, the eligibility determination unit 57 determines eligibility of the first physical quantity data. In a case where the first physical quantity data is determined to be eligible, as shown in FIG. 11, the display unit 59 displays that an installation state of the sensor unit 30 is normal in a field of a diagnosis result. In a case where an installation state of the sensor unit 30 is normal, the failure determination unit 58 performs failure determination of an air conditioner.

In a case where the failure determination unit 58 determines that there is a failure, the display unit 59 displays that there is a failure in the field of a diagnosis result. Furthermore, for example, a check item for the user and the like are displayed on the display unit 59. At this time, an estimated failure part, a repair method, or the like may be displayed on the display unit 59, or necessity of repair may also be displayed.

Figure 12:
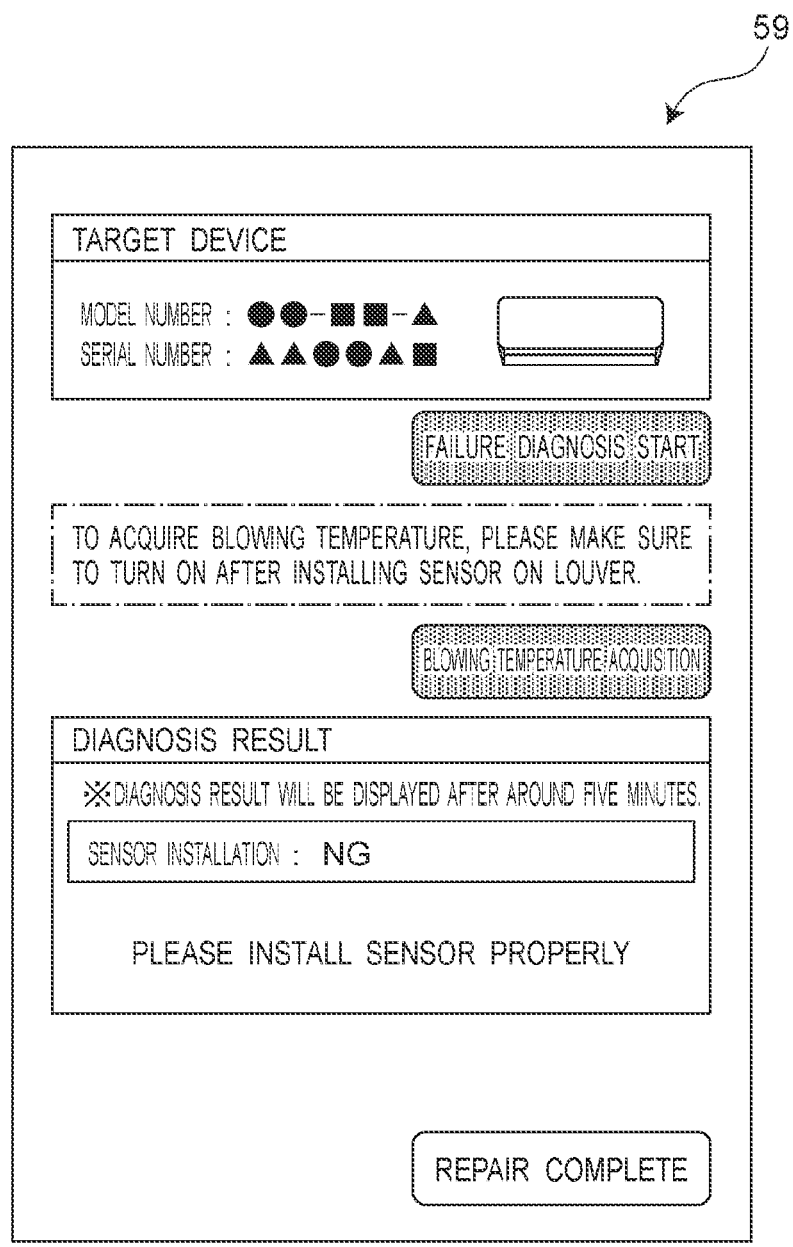
FIG. 12 is a schematic diagram illustrating display content of the display unit of the failure diagnosis device in the failure diagnosis according to the present disclosure.

In a case where an installation state of the sensor unit 30 is not normal, As shown in FIG. 12, on the display unit 59, information indicating that the installation state of the sensor unit 30 is not good is displayed in the field of a diagnosis result, and display for prompting appropriate installation of the sensor unit 30 in the home appliance 10 is performed. At this time, the display unit 59 may display a specific location where the sensor unit 30 is to be attached, or may display that an installation position of the sensor unit 30 is inappropriate.

The display illustrated in FIGS. 8 to 12 illustrates a concept at the time of performing the failure diagnosis, and may include other display other than the above-described display. For example, the display illustrated in FIGS. 8 to 12 may include display of current time, user information, a help button, and the like. Further, the display illustrated in FIGS. 8 to 12 may be changed according to a type of the home appliance 10.

Note that the present disclosure is not limited to the above embodiment, and can be implemented in various other modes. In the above embodiment, the failure diagnosis is performed by the failure diagnosis device 50, but the present disclosure is not limited to this. For example, the failure diagnosis may be performed by a home appliance, a sensor unit, or the like without using the failure diagnosis device 50. That is, in the home appliance or the sensor unit, a constituent element used for failure diagnosis such as the data comparison unit 56, the eligibility determination unit 57, and the failure determination unit 58 may be provided, and the home appliance or the sensor unit may have the function of the failure diagnosis device 50.

Further, the control information conversion unit 55 is provided in the failure diagnosis device 50, but the present disclosure is not limited to this. For example, the control information conversion unit 55 may be provided in the home appliance 10. In a case where the first control information of the home appliance 10 is converted into a physical quantity of the second physical quantity data, after the control information is converted in the home appliance 10, the converted data may be transmitted to the failure diagnosis device 50 by the communication unit 16.

Further, although the data storage unit 53 stores data transmitted by the communication unit 51 in association with time information, the present disclosure is not limited to this. For example, the eligibility determination unit 57 may determine eligibility of the first physical quantity data by using information of the home appliance 10 and the sensor unit 30 in real time.

Further, the data acquisition unit 34 may acquire third physical quantity data of a type different from that of the first physical quantity data and the second physical quantity data from the third sensor 32c. In addition to the comparison between the second physical quantity data and the first control information, the data comparison unit 56 may further compare the third physical quantity data with second control information of the home appliance 10 related to the third physical quantity data. The eligibility determination unit 57 may determine eligibility of the first physical quantity data based on comparison between the second physical quantity data and the first control information and comparison between the third physical quantity data and the second control information.

For example, in a case where the home appliance 10 is an air conditioner, the third sensor is a sensor that measures blown air volume of the air conditioner. The eligibility determination unit 57 further uses blown air volume of the air conditioner measured by the third sensor and blown air volume in the first control information of the air conditioner to determine eligibility of blowing temperature (first physical quantity data) of the air conditioner. By considering not only an inclination angle of a louver but also blown air volume in the determination of eligibility, determination accuracy for eligibility can be further improved.

Further, although the case where the home appliance 10 is an air conditioner is described, the home appliance 10 may be, for example, a washing machine. The sensor unit 30 is detachably attached in a chamber of a heat pump when failure diagnosis of the home appliance 10 is performed. The first sensor 32a of the sensor unit 30 is, for example, a sensor that measures volume of air circulating in the washing machine. The second sensor 32b of the sensor unit 30 is, for example, a sensor that measures intake air temperature in the washing machine.

The eligibility determination unit 57 determines eligibility of air volume data measured by the first sensor 32a by using intake air temperature measured by the second sensor 32b and intake air temperature in the first control information of the washing machine. This makes it possible to determine whether or not the sensor unit 30 is appropriately installed in the chamber of the heat pump, and to improve accuracy of failure diagnosis of air volume control of the washing machine.

Further, the home appliance 10 may be, for example, a refrigerator. The sensor unit 30 is detachably attached in interior of the refrigerator when failure diagnosis of the home appliance 10 is performed. The first sensor 32a of the sensor unit 30 is, for example, a sensor that measures humidity in the refrigerator. The second sensor 32b of the sensor unit 30 is, for example, a sensor that measures a light amount in the refrigerator. The first sensor 32a may be a sensor that measures temperature in the refrigerator.

The eligibility determination unit 57 determines eligibility of humidity data measured by the first sensor 32a by using a light amount measured by the second sensor 32b and a light amount in the first control information of the refrigerator (light amount converted from an ON/OFF state of a lamp in the refrigerator). This makes it possible to determine whether or not the sensor unit 30 is installed in the refrigerator in a state where a door is closed, and to improve accuracy of failure diagnosis of humidity control of the refrigerator.

Further, although the communication unit 51 receives control information and the information of the data acquisition unit 14 from the communication unit 16 and receives measurement data from the data transmission unit 36, the present disclosure is not limited to this. For example, the communication unit 51 may receive the information via a cloud or the like.

Although the present disclosure is sufficiently described in connection with a preferred embodiment with reference to the accompanying drawings, various changes and modifications are obvious to those skilled in the art. Such changes and modifications are to be understood as being included within the scope of the present disclosure as set forth in the appended claims as long as not deviating from the scope. Further, a combination of elements and a change in order in the embodiment can be realized without departing from the scope and spirit of the present disclosure.

The failure diagnosis device, the failure diagnosis system, the home appliance, the sensor unit, and the failure diagnosis method according to the present disclosure are useful in a case where failure diagnosis of the home appliance is performed.

EXPLANATIONS OF LETTERS OR NUMERALS 1 failure diagnosis system
10 home appliance
12 control unit
14 data acquisition unit
16 communication unit
18 sensor
30 sensor unit
32 sensor
34 data acquisition unit
36 data transmission unit
50 failure diagnosis device
51 communication unit
53 data storage unit
55 control information conversion unit
56 data comparison unit
57 eligibility determination unit
58 failure determination unit
59 display unit

The invention claimed is:

1. A failure diagnosis device comprising:
a communication unit that acquires first physical quantity data and second physical quantity data of a type different from that of the first physical quantity data that are used for performing failure diagnosis of a home appliance acquired by a sensor unit, and first control information related to the second physical quantity data acquired by the home appliance; and
a CPU configured to:
  i) compare the second physical quantity data with the first control information; and
  ii) determine whether or not the first physical quantity data is eligible as data used for the failure diagnosis based on a comparison result.

2. The failure diagnosis device according to claim 1, wherein the CPU converts the first control information into a physical quantity which is same as the second physical quantity data and compares the second physical quantity data with the first control information.

3. The failure diagnosis device according to claim 1, wherein
the CPU configured to:
  further acquire third physical quantity data of a type different from that of the first physical quantity data and the second physical quantity data acquired by the sensor unit, and second control information related to the third physical quantity data acquired by the home appliance, and
  further compare the third physical quantity data with the second control information.

4. A home appliance for which to perform failure diagnosis using a plurality of types of measurement data measured by a sensor unit, the home appliance comprising the failure diagnosis device according to claim 1.

5. A sensor unit that measures a plurality of types of data related to a home appliance and performs failure diagnosis of the home appliance, the sensor unit comprising the failure diagnosis device according to claim 1.

6. A failure diagnosis system comprising:
a home appliance;
a sensor unit that measures a plurality of types of data related to the home appliance; and
a failure diagnosis device that performs failure diagnosis of the home appliance,
wherein the failure diagnosis device includes:
a communication unit that acquires first physical quantity data and second physical quantity data of a type different from that of the first physical quantity data that are used for performing failure diagnosis of the home appliance acquired by the sensor unit, and first control information related to the second physical quantity data acquired by the home appliance,
a CPU configured to:
  compare the second physical quantity data with the first control information, and
  determine whether or not the first physical quantity data is eligible as data used for the failure diagnosis based on a comparison result.

7. A failure diagnosis method comprising the steps of: acquiring first physical quantity data and second physical quantity data of a type different from that of the first physical quantity data that are used for performing failure diagnosis of a home appliance acquired by a sensor unit, and first control information related to the second physical quantity data acquired by the home appliance; comparing the second physical quantity data with the first control information; and determining whether or not the first physical quantity data is eligible as data used for the failure diagnosis based on a comparison result obtained in the comparing step.

* * * * *